United States Patent
Fado et al.

[11] Patent Number: 5,949,887
[45] Date of Patent: Sep. 7, 1999

[54] METHOD AND GRAPHICAL USER INTERFACE FOR CONFIGURING AN AUDIO SYSTEM

[75] Inventors: Frank Fado, Highland Beach; Peter Guasti, Coral Springs; Amado Nassiff, Boynton Beach, all of Fla.

[73] Assignee: International Business Machines Corporation, Armonk, N.Y.

[21] Appl. No.: 08/862,742

[22] Filed: May 23, 1997

[51] Int. Cl.$^6$ .................................................. G06F 3/00
[52] U.S. Cl. .......................... 381/58; 381/107; 381/110; 345/978; 345/338
[58] Field of Search .................... 345/326–358, 345/978; 704/200, 201; 381/58, 60, 104, 107, 110

[56] References Cited

U.S. PATENT DOCUMENTS

| | | | |
|---|---|---|---|
| 3,760,102 | 9/1973 | Robinson et al. | 381/58 |
| 4,771,472 | 9/1988 | Williams, III et al. | 381/110 X |
| 4,959,867 | 9/1990 | Lutz | 381/107 |
| 5,212,733 | 5/1993 | DeVitt et al. | 381/119 |
| 5,390,138 | 2/1995 | Milne et al. | 381/119 |
| 5,742,779 | 4/1998 | Steele et al. | 345/978 X |
| 5,748,191 | 5/1998 | Rozak et al. | 345/978 X |
| 5,819,225 | 10/1998 | Eastwood et al. | 345/978 X |

*Primary Examiner*—John E. Breene
*Attorney, Agent, or Firm*—Quarles & Brady LLP

[57] ABSTRACT

A method for configuring an audio interface between a microphone and an audio card comprises the steps of: generating at least one graphical user interface for displaying user instructions, dynamic feedback, a predetermined number of test words and user controls, for example on a single screen; generating a pacer prompt for marking the words; prompting a user to speak each word into the microphone when marked by the pacer prompt; measuring at least one audio parameter of each spoken word; adjusting the audio parameter after the word is spoken, if the audio parameter is outside a predetermined range of values; and, successively repeating the prompting, measuring and adjusting steps for the words. The configuring continues until an adjusting step follows the final word, unless the audio parameter is sooner properly adjusted. A hardware optimization prompt can be generated if the adjustment is unsuccessful. A computer apparatus programmed with a set of instructions stored in a physical medium implements the method steps.

17 Claims, 5 Drawing Sheets

5,949,887

METHOD AND GRAPHICAL USER INTERFACE FOR CONFIGURING AN AUDIO SYSTEM

BACKGROUND OF THE INVENTION

1. Field of the Invention

This invention relates to the field of configuring an audio interface, and in particular, to a method and a graphical user interface for calibrating and optimizing the interaction of a microphone and an audio system in an audio interface of a computer apparatus.

2. Description of Related Art

The use of microphones in connection with personal computers has increased in popularity due to the advent of inexpensive multimedia computers. A microphone is generally connected to a sound card installed within a personal computer. The sound card receives and digitizes the analog signals generated by the microphone. The digital signals are processed by the processor of the personal computer for performing functions such as storage of an audio file in the memory of the personal computer or other audio related functions, for example, word recognition. The audio levels in which the analog audio signals are recorded at, prior to being digitized, are critical to any application that uses this data.

Accordingly, a need exists for a device and method which facilitates the proper configuring of these audio settings. The device or method should be user-friendly, and should display diagnostic information and instructions to the user for correcting problems.

SUMMARY OF THE INVENTION

The inventive arrangements taught herein, directed to a method, a graphical user interface and a computer apparatus, are provided for calibrating and optimizing the interaction of a microphone and an audio card in a personal computer.

In accordance with a first inventive arrangement, the a test-word by test-word analysis is provided, with audio adjustments being made immediately after each word is spoken, rather than waiting for an entire phrase to be completed. The adjustment and calibration can be completed faster, and using fewer test words.

In accordance with a second inventive arrangement, a pacer prompt is provided as a visual progress indicator to guide the user through the series of test words.

In accordance with a third inventive arrangement, the method requires only a small, fixed number of words, all of which are displayed during the calibration, so that the user knows exactly how long the calibration process will take by following the progress of the pacer prompt.

In accordance with a fourth inventive arrangement, all instructions and all test-words can be displayed on a single screen, which serves as a graphical user interface generated by the computer apparatus.

In accordance with a fifth inventive arrangement, a final test of the settings is based on a performance test using a sample to verify the adjustments have in fact been optimizes to an acceptable level of performance.

In accordance with a sixth inventive arrangement, the multimedia user interface provides hardware optimizer prompts which, for example, inform a user when additional hardware is required to achieve the acceptable level of performance. Such a hardware optimizer prompt can, for example, include instructions for connection of a signal adapter, such as an attenuator, between the microphone and the audio card.

In accordance with the foregoing inventive arrangements, a method for configuring an audio interface between a microphone and an audio card in a computer apparatus, comprises the steps of: generating at least one graphical user interface for displaying user instructions, for displaying dynamic feedback, for displaying a predetermined number of test words and for displaying user controls; generating a pacer prompt for successively marking each one of the predetermined number of test words; prompting a user to speak each of the predetermined number of test words into the microphone when each of the predetermined number of test words is marked by the pacer prompt; measuring at least one audio parameter of each spoken word; adjusting the at least one measured audio parameter of the audio interface after each the predetermined number of test words is spoken into the microphone, if the at least one measured audio parameter is outside a predetermined range of values; and, successively repeating the prompting, measuring and adjusting steps for the test words. The prompting, measuring and adjusting steps are successively repeated for each of the predetermined number of test words until one of the adjusting steps has been undertaken for each of the predetermined number of words, unless the at least one audio parameter is adjusted to within the predetermined range of values before all of the predetermined number of test words has been spoken.

The method can further comprise the step of generating a single graphical user interface for providing the user instructions and dynamic feedback in a first display; displaying the predetermined number of test words in a second area of the screen; and, displaying the user controls in a third area of the screen.

The method can also further comprise the step of generating a single graphical user interface for displaying all of the user instructions, the dynamic feedback, the predetermined number of test words and the user controls. In this event, the method of can comprise the still further steps of: displaying the user instructions and dynamic feedback in a first area of the single graphical user interface; displaying the predetermined number of test words in a second area of the single graphical user interface; and, displaying the user controls in a third area of the single graphical user interface.

In further accordance with the foregoing inventive arrangements, a computer apparatus programmed with a set of instructions for generating a graphical user interface for configuring an audio interface between a microphone and an audio card in the computer apparatus, comprises: first means for generating at least one graphical user interface for displaying user instructions, for displaying dynamic feedback, for displaying a predetermined number of test words and for displaying user controls; second means for generating a pacer prompt for successively marking each one of the predetermined number of test words; third means for successively prompting a user to speak each of the predetermined number of words into the microphone when each of the predetermined number of words is marked by the pacer prompt; fourth means for measuring at least one audio parameter of each spoken word; and, fifth means for adjusting the at least one measured audio parameter of the audio interface if the at least one measured audio parameter is outside a predetermined range of values after each of the predetermined number of words is successively spoken into the microphone.

The computer apparatus can further comprise sixth means for generating a second graphical user interface for displaying a hardware optimizer prompt, when the at least one audio parameter has not been adjusted to within the predetermined range of values after operation of the third and fourth means has been inhibited.

The operation of the third, fourth and fifth means is inhibited when: the at least one audio parameter is adjusted to within the predetermined range of values before all of the predetermined number of test words has been spoken; and, the at least one audio parameter has been adjusted by the fifth means after a final one of the test words has been spoken.

Advantageously, the first means for generating the first graphical user interface displays a single screen having a first area for displaying the user instructions and dynamic feedback, a second area for displaying the predetermined number of test words and a third area for displaying user controls.

DETAILED DESCRIPTION OF THE PREFERRED EMBODIMENTS

Figure 1:
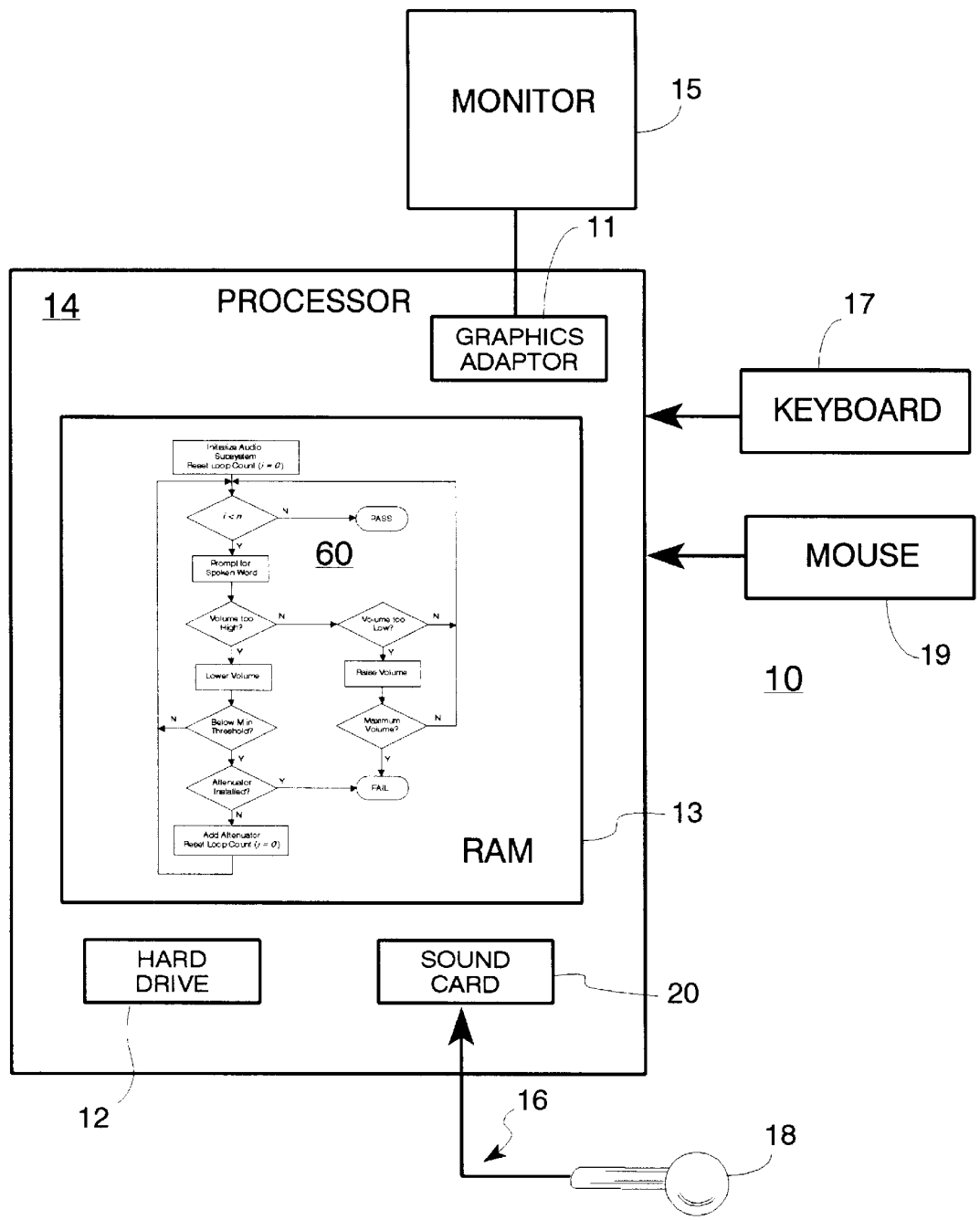
FIG. 1 is a block diagram of a computer apparatus in accordance with the inventive arrangements, for implementing the method and generating the graphical user interfaces taught herein.

With reference to FIG. 1, a computer apparatus 10 is shown in block diagram form. The computer apparatus is programmed with a set of instructions stored in a physical medium, for example a hard drive 12 and/or a random access memory, or RAM, 13 of a central processor 14, for optimizing an audio interface 16 between a microphone 18 and a sound or audio card 20 in the computer apparatus. Optimizing the interface can include optimizing at least one of a plurality of parameters, for example, microphone volume, tone and frequency response. The computer apparatus 10 generates at least one graphical user interface for displaying user instructions, dynamic feedback information, a predetermined number of test words and user controls. The computer apparatus further comprises a monitor 15, a keyboard 17 and a mouse 19. The flow chart shown in random access memory 13 is a small scale depiction of the flow chart 60 shown in FIG. 5, and is intended to represent a programmed routine of instructions, in accordance with the inventive arrangements, stored in a physical medium embodied by hard drive 12 and loaded into another physical medium embodied by random access memory 13. The various graphical user interface screens shown herein are generated by a graphics adapter card 11.

Figure 2:
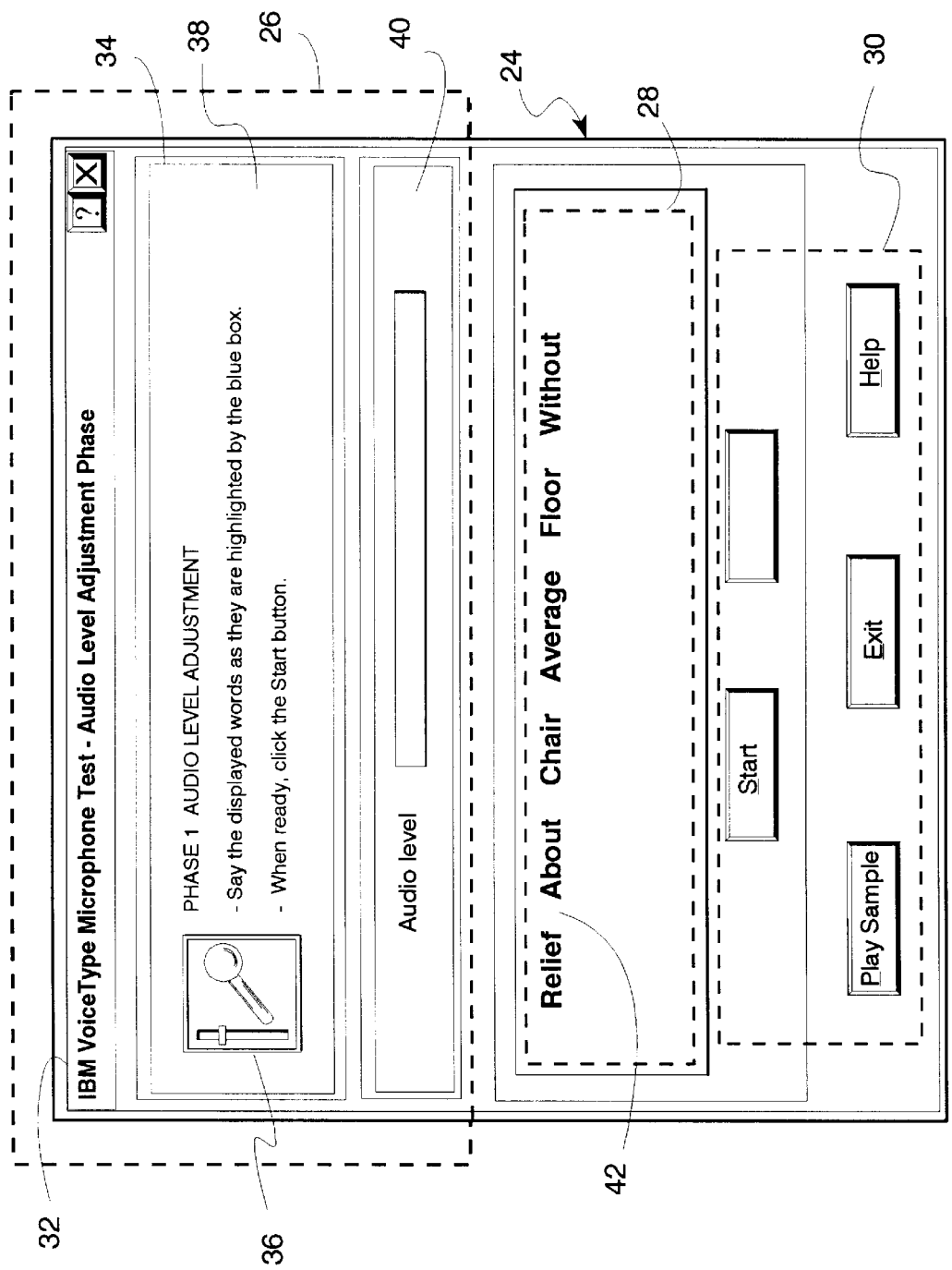
FIG. 2 is a graphical user interface screen display generated by the computer apparatus of FIG. 1 in accordance with the inventive arrangements.

Advantageously, the graphical user interface comprises a first screen in which the user instructions, the dynamic feedback information, the predetermined number of test words and the user controls are all displayed simultaneously. The first screen 24 is directed to optimizing the parameter of microphone volume in the audio interface 16. As shown in FIG. 2, the first screen 24 has three principle display areas related to the optimization process. A first display area 26 includes the user instructions and the dynamic feedback information, a second display area 28 includes the list of predetermined words and a third display area 30 includes the user controls.

The first display area 26, also referred to as the Status Area, includes a number of sub areas. A first sub area 32 identifies the stored program which is running on the computer apparatus 10, and what part of the program is running, for example, "IBM VoiceType Microphone Test—Audio Level Adjustment Phase". A second sub area 34 displays an icon 36 illustrative of the program, in this case a microphone and a slide switch. A third sub area 38 provides specific user instructions, for example "Say the displayed words as they are highlighted by the blue box. When ready, click the Start button". A fourth sub area 40 displays a bar style Audio Level meter, so that the audio level of the spoken words can be monitored by the user as the words are spoken.

The second display area 28, also referred to as the test word area, is a list, for example in a horizontal array 42, of a predetermined small number of test words which must be spoken in succession during the course of the audio level adjustment process. In a presently preferred embodiment, only six test words are required.

The third display area 30 includes such user controls as, for example, "Start", "Play Sample", "Exit" and "Help".

Figure 3:
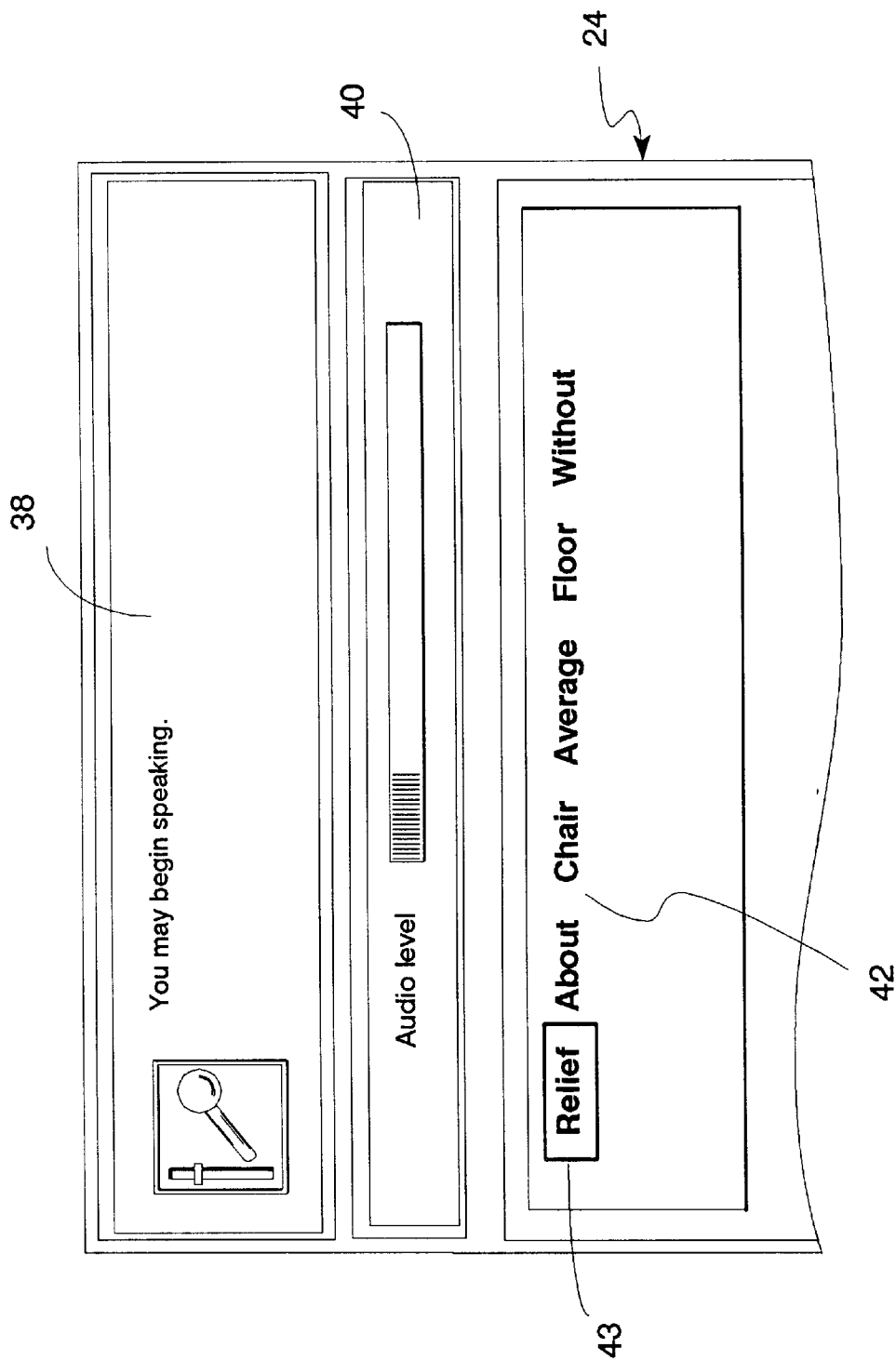
FIG. 3 is a portion of the graphical user interface screen display of FIG. 2, in a further display mode.

If the "Start" button is selected, for example being clicked on by a mouse controlled cursor, a portion of the first screen 24, will appear as shown in FIG. 3. The specific user instruction now appearing in third sub area 38 is "You may begin speaking". A pacer prompt 43 in the form of a rectangle, for example a blue rectangle, surrounds and thus highlights the first word which should be spoken by the user into the microphone 18. The Audio Level meter in the fourth sub area 40 shows a certain level, providing dynamic feedback that the audio card and the program are processing the word being spoken. After each word is processed, the pacer prompt 43 will move to the next word in the array, and so on, as the optimization process continues. The pacer prompt 43 and the dynamic feedback are available throughout this phase of the process.

Under some circumstances, the audio interface will not be optimized after the array of test words has been spoken and processed. This can occur when the hardware parameters of the audio card 20 and the 18 are too incompatible. An example of one failure which can occur is that the audio level cannot be adjusted low enough, indicating that the signal from the microphone 18 is too large.

Figure 4:
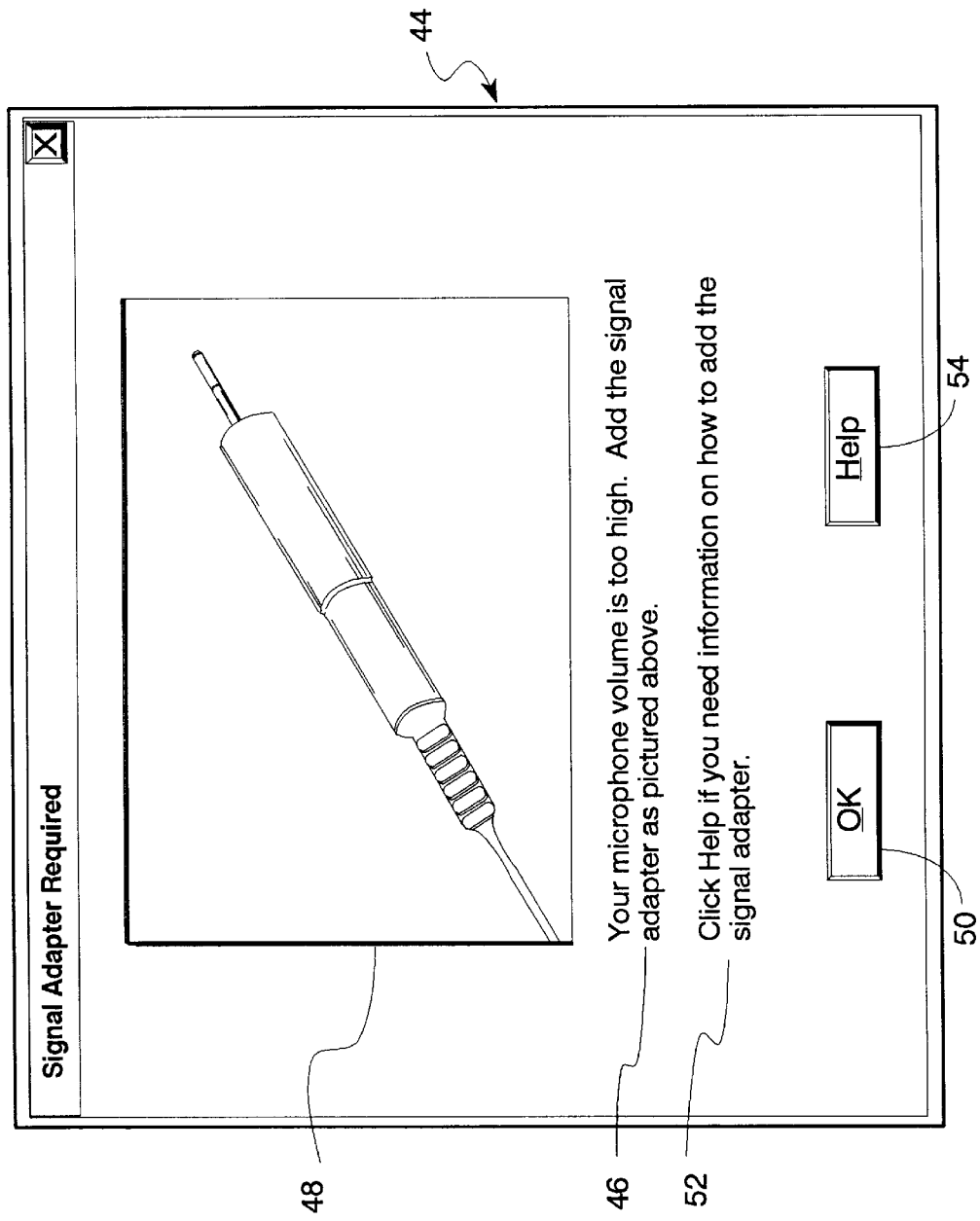
FIG. 4 is a second graphical user interface screen generated by the computer apparatus of FIG. 1 in accordance with the inventive arrangements, adapted for prompting a hardware optimization.

If the optimization failure is identified as a hardware incompatibility, a second graphical user interface screen 44 can be generated as shown in FIG. 4. Screen 44 is a hardware optimization screen, in this case keyed to the problem of too strong a signal from the microphone 18. Screen 44 displays an instruction 46 for fixing the hardware incompatibility, for example "Your microphone volume is too high. Add the signal adapter as pictured above." Pictured above the user instruction is a large picture 48 of the kind of signal adapter which can be coupled between a microphone and an audio card. An "OK" button 50 can be selected if the hardware prompt is understood.

It will be appreciated that many different kinds of signal adapters might be appropriate for fixing hardware incompatibilities. The illustration of a signal attenuator in FIG. 4 is appropriate for a signal strength or volume parameter, but is otherwise merely illustrative of signal adapters in general.

A second instruction 52, for example "Click Help if you need information on how to add the signal adapter." provides an alternative. A corresponding "Help" button 54 can be selected if more information is needed.

Figure 5:
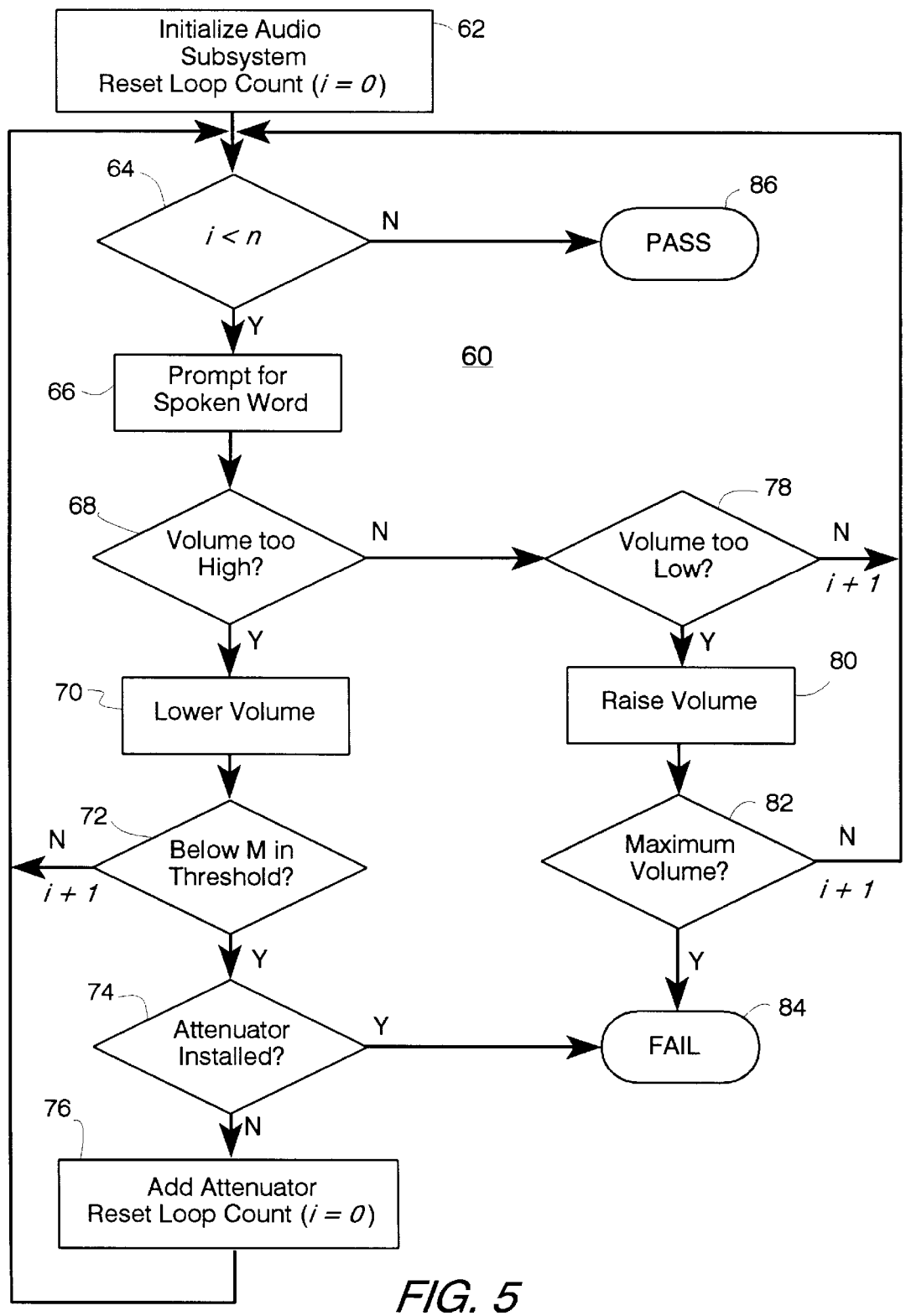
FIG. 5 is a flow chart useful for explaining the inventive arrangements.

The optimization method 60 is explained in connection with the flow chart shown in FIG. 5. When the program is started, the first step in block 62 is to Initialize the Audio Subsystem being optimized, in this case the microphone volume, and set the test word count i to i=0.

If i<n in block 64, where n is the number of test words, for example n=6, as would be the case at the beginning of the process, the pacer prompt is displayed to highlight the first test word and the user is prompted to speak the highlighted word in block 66.

If the volume is too high in block 68, the volume is incrementally lowered in block 70. If the volume is not too high in block 68, is the volume too low in block 78? If the volume is too low, the volume is incrementally raised in block 80. If the volume is not too low, i is incremented to i=i+1 and the loop returns to block 64.

If the volume has been lowered in block 70, is the volume below the threshold M in block 72? If the volume is not below the threshold M, i is incremented to i=i+1 and the loop returns to block 64. If the volume is below the threshold M, has the attenuator been installed in block 74? If the attenuator has not been installed, the hardware optimizer prompt to add the attenuating signal adapter is generated in block 76. In this case, i is reset to i=o and the loop returns to block 64 to start the process again. If the attenuator has been installed, the process is deemed to have failed in block 84.

If the volume has been raised in block 78, is the volume at a maximum? If the volume is not at a maximum, i is incremented to i=i+1 and the loop returns to block 64. If the volume is at a maximum, the process is deemed to have failed in block 84.

If the iterative process continues until i=n in block 64, the process is deemed to have been successful in block 86.

The invention is not limited to the precise arrangements and instrumentalities shown. Reference should be made to the appended claims, rather than to the foregoing specification, as indicating the scope of the invention.

What is claimed is:

1. A method for configuring an audio interface between a microphone and an audio card in a computer apparatus, comprising the steps of:

generating at least one graphical user interface for displaying user instructions, for displaying dynamic feedback, for displaying a predetermined number of test words and for displaying user controls;

generating a pacer prompt for successively marking each one of said predetermined number of test words;

prompting a user to speak each of said predetermined number of test words into said microphone when each of said predetermined number of test words is marked by said pacer prompt;

measuring at least one audio parameter of each said spoken test word;

adjusting said at least one measured audio parameter of said audio interface after each said test word is spoken into said microphone, if said at least one measured audio parameter is outside a predetermined range of values; and, successively repeating said prompting, measuring and adjusting steps for said test words.

2. The method of claim 1, comprising the step of successively repeating said prompting, measuring and adjusting steps for each of said predetermined number of test words until one of said adjusting steps has been undertaken for each of said predetermined number of words.

3. The method of claim 1, comprising the step of successively repeating said prompting, measuring and adjusting steps for each of said predetermined number of test words until said at least one audio parameter is adjusted to within said predetermined range of values.

4. The method of claim 1, comprising the step of successively repeating said prompting, measuring and adjusting steps for each of said predetermined number of test words until one of said adjusting steps has been undertaken for each of said predetermined number of words, unless said at least one audio parameter is adjusted to within said predetermined range of values before all of said predetermined number of test words has been spoken.

5. The method of claim 1, comprising the step of generating a single graphical user interface for displaying all of said user instructions, said dynamic feedback, said predetermined number of test words and said user controls.

6. The method of claim 5, comprising the steps of:

displaying said user instructions and dynamic feedback in a first area of said single graphical user interface;

displaying said predetermined number of test words in a second area of said single graphical user interface; and, displaying said user controls in a third area of said single graphical user interface.

7. The method of claim 1, further comprising the step of generating a second graphical user interface for displaying a hardware optimizer prompt, when said at least one audio parameter has not been adjusted to within said predetermined range of values after said prompting, measuring and adjusting steps have been repeated for each one of said predetermined number of test words.

8. A method for configuring an audio interface between a microphone and an audio card in a computer apparatus, comprising the steps of:

generating a first graphical user interface having a first area for displaying user instructions and dynamic feedback, having a second area for displaying a predetermined number of test words and having a third area for displaying user controls;

generating a pacer prompt for successively marking each one of said predetermined number of test words;

prompting a user to speak each of said predetermined number of words into said microphone when each of said predetermined number of words is marked by said pacer prompt;

measuring at least one audio parameter of each said spoken test word;

adjusting said at least one measured audio parameter of said audio interface after each said test word is spoken into said microphone, if said at least one measured audio parameter is outside a predetermined range of values;

successively repeating said prompting, measuring and adjusting steps for each of said predetermined number of test words until one of said adjusting steps has been undertaken for each of said predetermined number of words, unless said at least one audio parameter is adjusted to within said predetermined range of values before all of said predetermined number of test words has been spoken; and, generating a second graphical user interface for displaying a hardware optimizer prompt, when said at least one audio parameter has not been adjusted to within said predetermined range of values after said prompting, measuring and adjusting steps have been repeated for each one of said predetermined number of test words.

9. A computer apparatus programmed with a set of instructions for generating a graphical user interface for configuring an audio interface between a microphone and an audio card in said computer apparatus, comprising:

first means for generating at least one graphical user interface for displaying user instructions, for displaying dynamic feedback, for displaying a predetermined number of test words and for displaying user controls;

second means for generating a pacer prompt for successively marking each one of said predetermined number of test words;

third means for successively prompting a user to speak each of said predetermined number of words into said microphone when each of said predetermined number of words is marked by said pacer prompt;

fourth means for measuring at least one audio parameter of each said spoken word; and, fifth means for adjusting said at least one measured audio parameter of said audio interface if said at least one measured audio parameter is outside a predetermined range of values after each said predetermined number of words is successively spoken into said microphone.

10. The computer apparatus of claim 9, wherein operation of said third, fourth and fifth means is inhibited when said at least one audio parameter is adjusted to within said predetermined range of values before all of said predetermined number of test words has been spoken.

11. The computer apparatus of claim 9, wherein operation of said third, fourth and fifth means is inhibited when said at least measured one audio parameter has been adjusted by said fifth means after all of said test words have been spoken.

12. The computer apparatus of claim 11, further comprising sixth means for generating a second graphical user interface for displaying a hardware optimizer prompt, when said at least one audio parameter has not been adjusted to within said predetermined range of values after operation of said third and fourth means has been inhibited.

13. The computer apparatus of claim 9, wherein operation of said third, fourth and fifth means is inhibited when:

said at least one measured audio parameter is adjusted to within said predetermined range of values before all of said predetermined number of test words has been spoken; and, said at least one measured audio parameter has been adjusted by said fourth means after a final one of said test words has been spoken.

14. The computer apparatus of claim 13, further comprising sixth means for generating a second graphical user interface for displaying a hardware optimizer prompt, when said at least one measured audio parameter has not been adjusted to within said predetermined range of values after said at least one measured audio parameter has been adjusted by said fourth means after a final one of said test words has been spoken.

15. The computer apparatus of claim 9, further comprising sixth means for generating a second graphical user interface for displaying a hardware optimizer prompt, when said at least one audio parameter has not been adjusted to within said predetermined range of values after said at least one measured audio parameter has been adjusted by said fifth means after a final one of said test words has been spoken.

16. The computer apparatus of claim 15, wherein said first means for generating said first graphical user interface displays a single screen having a first area for displaying said user instructions and dynamic feedback, a second area for displaying said predetermined number of test words and a third area for displaying user controls.

17. The computer apparatus of claim 9, wherein said first means for generating said first graphical user interface displays a single screen having a first area for displaying said user instructions and dynamic feedback, a second area for displaying said predetermined number of test words and a third area for displaying user controls.

* * * * *